United States Patent [19]

James

[11] Patent Number: 5,169,205
[45] Date of Patent: Dec. 8, 1992

[54] EMERGENCY EXIT WINDOW

[75] Inventor: David R. James, Byron, Ga.

[73] Assignee: Blue Bird Body Company, Fort Valley, Ga.

[21] Appl. No.: 740,784

[22] Filed: Aug. 6, 1991

[51] Int. Cl.$^5$ .............................................. B60J 1/08
[52] U.S. Cl. ............................... 296/146 N; 296/201; 49/141; 292/21; 292/DIG. 65
[58] Field of Search ............... 296/178, 201, 155, 146; 49/141, 450; 292/21, 38, 42, DIG. 65

[56] References Cited

U.S. PATENT DOCUMENTS

| | | | |
|---|---|---|---|
| 2,605,517 | 8/1952 | Rucker | 49/450 |
| 2,660,274 | 11/1953 | Donathan | 49/141 |
| 2,793,722 | 5/1957 | Bingham | 49/141 |
| 2,967,595 | 1/1961 | Zitomer | 49/450 |
| 4,282,685 | 8/1981 | Williams et al. | 49/141 |
| 4,465,997 | 8/1984 | Hines | 292/DIG. 65 X |

Primary Examiner—Johnny D. Cherry
Assistant Examiner—Joseph D. Pape
Attorney, Agent, or Firm—Baker & McKenzie

[57] ABSTRACT

The invention relates to an emergency exit window for vehicles such as school buses. Spring biased latches are carried by the upper part of a window pane. The spring biased latches have bolts which engage stops at various locations on opposite sides of the window frame surrounding the window. The latches may be normally operated individually by hand to riase and lower the window between a ventilating position (including half-open and other partially open positions), and a fully closed position. The window is equipped with an emergency handle which may be used to pull the latches towards each other, and thereby enable the window to assume a fully open position. In the fully open position, inversion stops prevent the window from inadvertently closing in the event that the vehicle is overturned. The latches are housed in a latch cover which has latch openings. The latch openings are sized so that they prevent manual use of the latches to cause the window to be fully opened. Therefore, only the emergency handle may be used to move the window to the fully open emergency position.

12 Claims, 4 Drawing Sheets

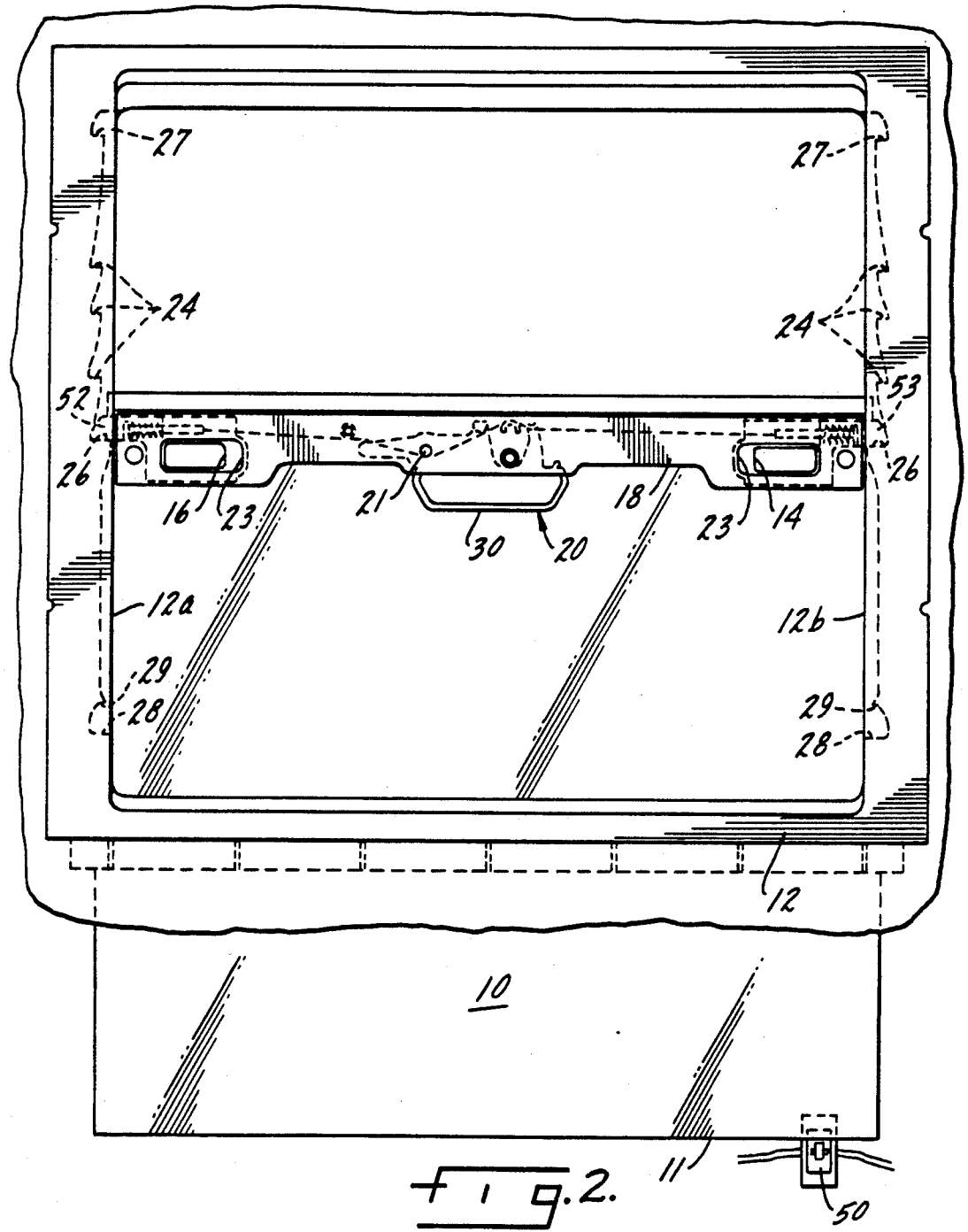

5,169,205

EMERGENCY EXIT WINDOW

BACKGROUND AND SUMMARY OF THE INVENTION

This invention relates to a window for vehicles such as school buses, and in particular, relates to a window which can be fully opened to serve as an emergency exit from such vehicles.

Vehicles for mass transportation are required by law to have emergency exits. For example, school buses frequently have rear exit doors from which passengers may exit in case of emergency. Other buses have windows which are mounted to a window sash which has hinges at the top so that in case of emergency the entire window sash can be swung outward to allow egress. Some buses are equipped with roof hatches which serve as emergency exits.

These examples of emergency exits clearly require specially designed hardware and other components, and therefore, are very expensive. Furthermore, specialized emergency exit facilities, such as those described above, may become damaged during an accident rendering them non-functional, in which case the availability of emergency exits can be dangerously reduced.

A further disadvantage of window sashes and hatches which are hinged is that they tend to swing closed and thereby hinder passage through the openings they provide.

It is therefore an object of the present invention to provide a window which can operate both as a means for ventilation, and as an emergency exit.

Another object of the present invention is to provide an emergency exit window which provides unobstructed egress from a vehicle.

Yet another object of the present invention is to provide a window for school buses having emergency exit capability which can be used throughout the school bus, thereby substantially increasing the number of emergency exits.

Still another object of the present invention is to provide an emergency exit window which can be easily moved to the fully open position.

A further object of the present invention is to provide an emergency exit window which can be quickly moved to the fully open position from any other position, i.e. fully closed or partially open.

These and other objects and advantages of the present invention are achieved with an emergency exit window which has two bolt type spring-loaded latches carried by the upper part of a window pane. The bolt type latches engage ratchets or stops which are part of the window frame surrounding the pane. The latches may normally be operated by hand in such a way that a user can insert his or her fingers into recesses formed in the latches and move the latches laterally towards each other to disengage the latches from various stops. The window normally moves between a fully closed position and a half-open (fully venting) position. However, an emergency handle located at the center of the top portion of the window pane can be used to move the latches such that the window can assume a fully opened position. The emergency exit handle is used to apply tension to a cable which is connected to the latches. Rotation of the emergency handle causes the latches to move an amount which is greater than the amount of movement able to be achieved when the latches are manipulated individually by hand. When the window is in the fully open position, the latches engage reverse stops which prevent the window from inadvertently closing in the event the bus is overturned.

The objects and advantages of the invention will be better understood upon a reading of the following specification read in conjunction with the accompanying drawings.

BRIEF DESCRIPTION OF THE DRAWINGS

FIG. 2 is a front elevational view of a window of the present invention in the half-open or fully venting position;

DETAILED DESCRIPTION OF THE INVENTION

Figure 1:
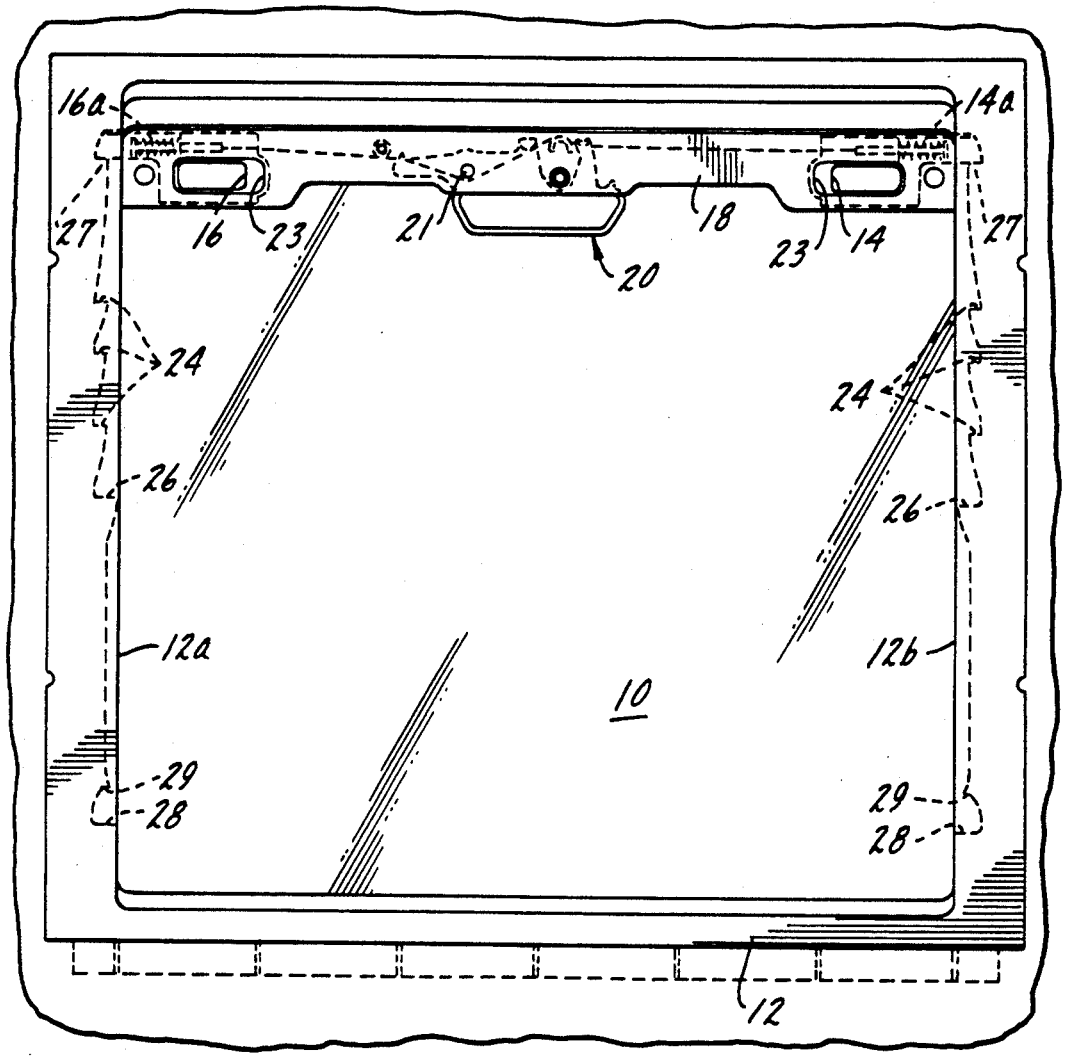
FIG. 1 is a front elevational view of a window of the present invention in the fully closed position.

FIG. 1 shows a window pane 10 and frame 12 of the present invention. A right hand latch 14 and a left hand latch 16 are carried by the top portion of the pane 10 and are held in place by a latch cover 18. The latch cover 18 also supports an emergency handle 20 mounted at the center of the top portion of the pane 10. The latches 14 and 16 are spring biased via springs 14a and 16a respectively and further engage intermediate stops 24 and main stops 26 which are located on the right and left side of the window frame 12. The stops 24 and 26 hold the window at various ventilating positions. The stops 24, 26 are carried in the vertical rails shown generally at 12a and 12b. The top stops 27 hold the window in a closed position. At the bottom of the left and right sides of the window frame 12 are bottom stops 28 and inversion stops 29. As will be discussed below, the emergency handle 20 is used to move the latches past the main stops 26 to allow the window to assume the fully open position, and to allow the latches 14 and 16 to engage the bottom stops 28. The latch cover 18 has latch rail openings 23 which allow a user to manipulate the latches 14 and 16.

Figure 3:
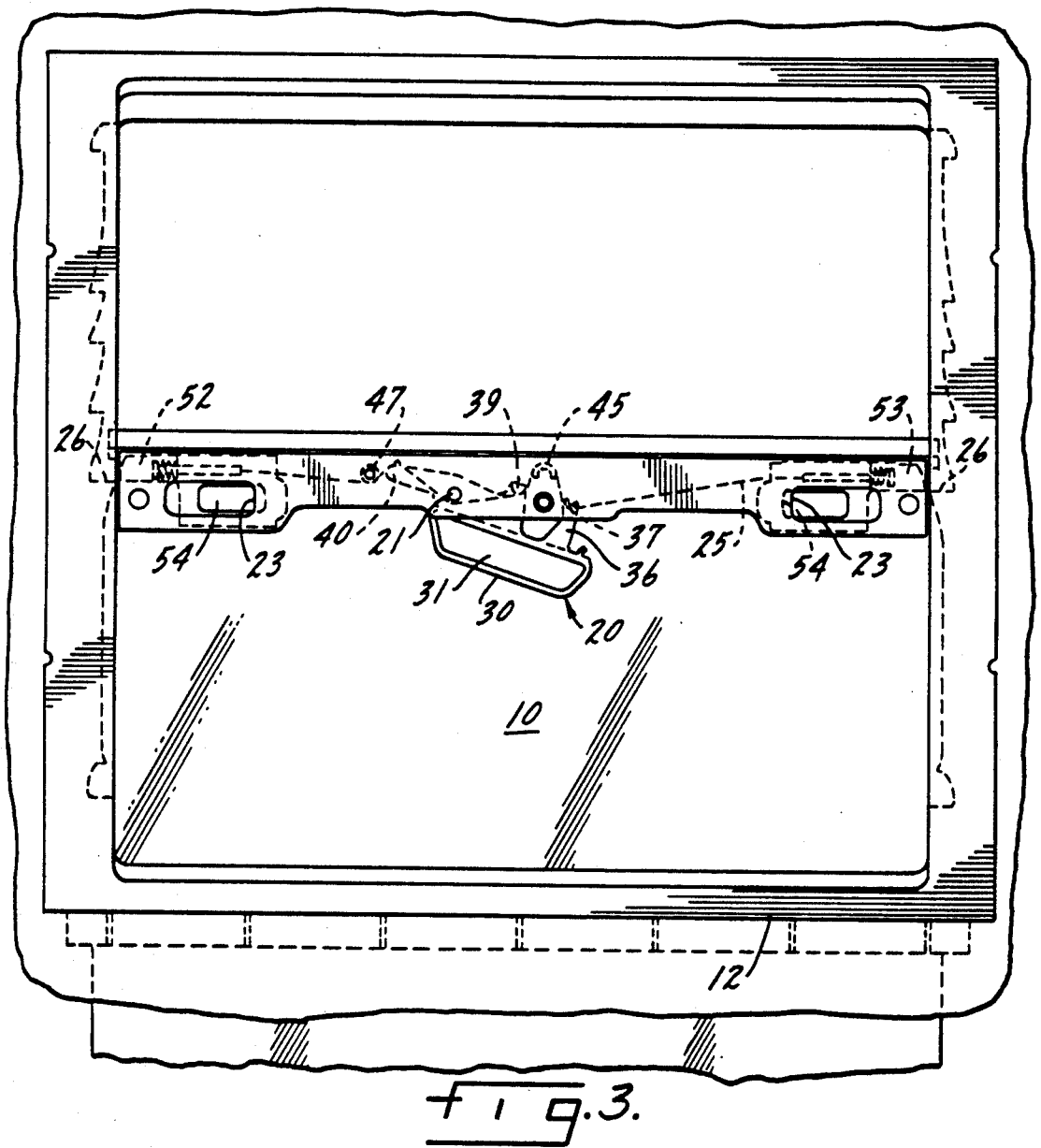
FIG. 3 is a front elevational view of a window of the present invention showing rotation of the emergency handle.
Figure 7:
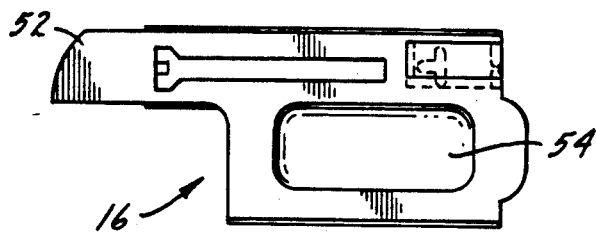
FIG. 7 is an elevational view of a latch of the present invention.
Figure 8:
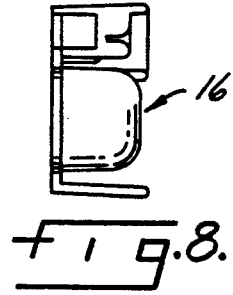
FIG. 8 is an end view of the latch shown in FIG. 7.

FIG. 2 shows the window pane 10 in a half-open or fully venting position. Latch bolts 52 and 53 are resting on the main stops 26. The main stops 26 protrude inwardly farther than the intermediate stops 24. The enlarged size of the main stops 26 prevent movement of the pane 10 past the main stops 26, unless the emergency handle is used as shown in FIG. 3. The extent of the latch rail openings 23 relative to the position of the latches 14 and 16 is such that the latch bolts 52 and 53 cannot be moved by individual manipulation past the main stops 26. FIG. 2 shows a switch 50 mounted to the inside sidewall of the bus just below the reach of the pane 1? when it is in the half-open position. The bottom edge 11 of the pane 10 engages a switch 50 upon movement of the pane 10 below the half-open position, a movement which, as discussed below, can only occur when the emergency handle 20 is used to activate the latches 14 and 16. Engagement between the pane 10 and the switch 50 signals the driver to let him know that the window is being moved to an emergency or fully open position.

Figures 5, 6:
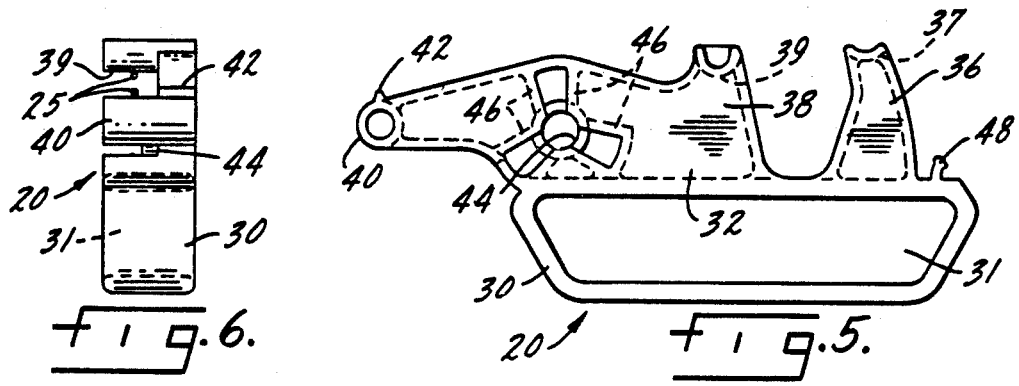
FIG. 5 is an elevational view of the emergency handle of the present invention.
FIG. 6 is an end view of the handle as shown in FIG. 5.

FIG. 3 shows how the emergency handle may be used to move the latch bolts 52 and 53 out of engagement with the main stops 26. As shown in FIG. 5, the emergency handle 20 is comprised of a ring 30 forming an opening 31 in the lower portion of the handle. The upper part of the handle 20 includes a cable tensioning section 32. A rear finger 36 extends upwardly from the ring 30. The finger 36 has a horizontal fingertip 37 which is arcuate on its underside. A front finger 38 is on the opposite side of the slot 34. The front finger 38 also has a horizontally extending fingertip 39 which is rounded on its underside. A forward deflector 40 with handle stop 42 extends from the front of the emergency handle 20. The stop 42 has a vertical dimension generally larger than the diameter of the cable 25 so that upon rotation of the handle 20, the stop 42 will engage the top panel of the latch cover 18, thus preventing the cable from becoming pinched between the deflector 40 and the latch cover 18. Between the deflector 40 and the front finger 38, the handle has a pivot ring 44 with six support ribs 46 extending radially therefrom. The support ribs 46 provide the pivot ring with increased rigidity, since, as shown in FIG. 3, the emergency handle 20 is supported substantially entirely by engagement between the pivot ring 44 and the pivot pin 21. Opposite ends of the cable 25 are attached to the latches 14 and 16. The cable is wound circuitously through six rounded deflection points, three of which are fixed and three of which are moving parts of the emergency handle 20.

Upon rotation of the handle 20 to about 20° below horizontal in the clockwise direction, or until stop 42 contacts cover 18, the fingertips 37 and 39 force the cable 25 downward around the main bearing sleeve 45. At the same time, the deflector 40 lifts the cable 25 upwardly between the secondary bearing sleeve 47 and the pivot pin 21. The forces thus applied to the cable 25 by the three deflection points 37, 39 and 42 of the handle 20 and the three fixed deflection points 21, 45 and 47 increase the circuitousness of the path of the cable 25 and cause inward movement of the latches 14 and 16 and the respective bolts 53 and 52. Rotation of the handle 20 enables inward movement of the bolts out of engagement with the main stops 26. Such movement requires that the finger recesses 54 of the latches 14 and 16 move substantially past the latch rail openings 23. The latch rail openings 23 prevent individual movement of the finger recess 54 and the bolts 53 and 52 past the main stops 26: therefore, only the emergency handle 20 may be used to move the window to the fully open position.

The latches 14 and 16 have two ways by which they may be actuated. The first is by direct use of the finger recess 54. This first method of actuation is used only to raise and lower the window pane in normal use between the fully closed position (FIG. 1) and the half-open position (FIG. 2). The second method of actuation of the latches 14 and 16 is by the emergency handle 20. This second method of actuation is useable to move the window past the main stops 26 into the fully open position (FIG. 3). Both the first and second methods of actuating the latches result in laterally inward movement of the latches. However, use of the emergency handle 20, rather than the finger recesses 54, results in greater movement of the latches, and it is this greater movement which enables the bolts 52 and 53 to move past the main stops 26, thus allowing full downward movement of the pane 10 to the fully open position.

Figure 4:
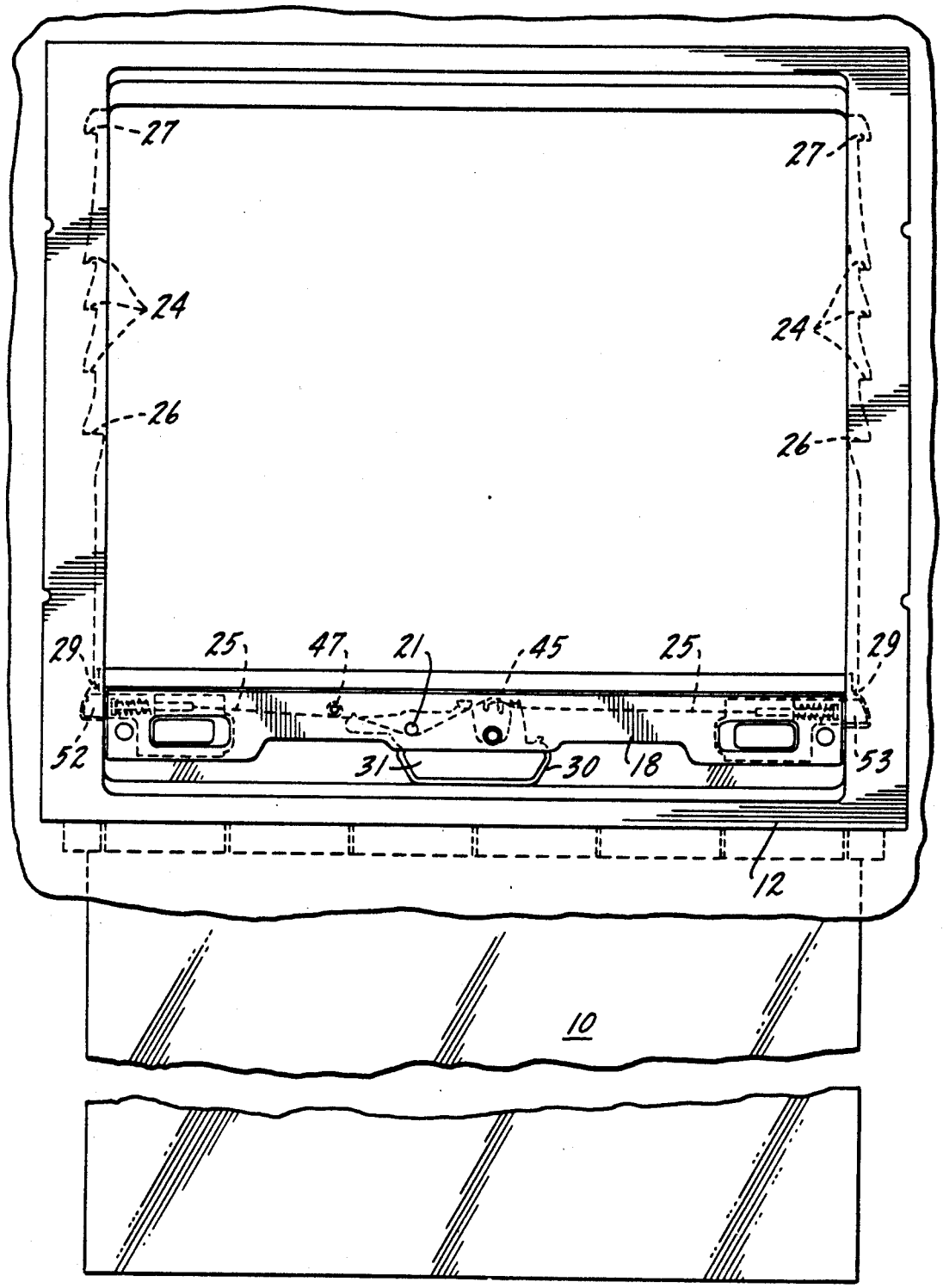
FIG. 4 is a front elevational view of a window of the present invention in the fully open position.

FIG. 4 shows the window at rest in the fully open position. In the fully open position, a typical window of the present invention will provide a clear opening of about 18.2 inches (vertical) by about 23.75 inches (horizontal). Such an opening is clearly more than adequate for children, and is sufficient for adults. The bolts 52 and 53 are disposed between the bottom stops 28 and the inversion stops 29. Thus, in the event that the vehicle is overturned, the inversion stops 29 will prevent the closing of the window unless the latches 14 and 16 are operated. The inward extent of the inversion stops 29 is such that the finger recesses 54 can be used to move the bolts 52 and 53 so that the bolts may be pushed past the inversion stops 29. The window thus may be moved to a ventilating or fully closed position. The catch post 48 on the right portion of the ring 30 (see FIG. 5) is used to retain the emergency handle 20 in its horizontal position.

A substantial advantage of the present invention is its simplicity of design, the economics of which enable the window of the present invention to be used throughout a vehicle, not merely at a few strategic locations. This provides a significant increase in the number of possible emergency exits available to passengers. In addition, the simplicity of the design makes the operation of the window easy to understand, so that even young, unsophisticated or infirm passengers can move the window to the emergency or fully open position simply by pulling downwardly on the emergency handle.

While a specific embodiment of the invention has been shown and described, it will be apparent to those skilled in the art that numerous alternatives, modifications, and variations of the embodiment shown can be made without departing from the spirit and scope of the appended claims.

I claim:

1. An emergency exit window comprising:
   a window frame defining a passageway, pane means for closing and opening said passageway, said pane means having a plurality of open positions including at least one ventilating position wherein said passageway is less than fully open, and an emergency position wherein said passageway is fully open, retaining means for holding said pane means in open and closed positions, said retaining means comprising latch means carried by said pane means, and stop means carried by said frame, said latch means having first actuation means for moving said pane means between a closed position and said at least one ventilating positions, and second actuation means for moving said pane means to said emergency position,
   said latch means comprises a pair of sliding spring biased latches, and said first actuation means comprises finger operating means connected to said latches for manually moving said latches out of engagement with said stop means,
   said second actuation means comprises tension means connected to inner ends of said latches, and emergency handle means for pulling said tension means and said latches, said stop means including at least one enlarged stop for preventing movement of said pane means to said emergency position by actuation of said first actuation means, said emergency handle means being capable of moving said latches an amount sufficient to allow said latches to move past said enlarged stop.

2. An emergency exit window in accordance with claim 1 wherein:
said tension means comprises at least one flexible cable connected to said latches, said second actuation means further comprising cable guide means for directing said cable through a predetermined path, said emergency handle means having cable tension means for increasing tension in said cable whereby said latches are moved towards each other upon actuation of said emergency handle.

3. An emergency exit window in accordance with claim 2 wherein:
said emergency handle means is pivotable in a plane generally parallel to said pane means,
said cable tensioning means comprises at least one bearing positioned adjacent to said cable guide means whereby rotation of said emergency handle means in said plane causes movement of said latches.

4. An emergency exit window in accordance with claim 3 wherein:
approximately 20° of rotation of said emergency handle means causes sufficient movement of said latches to allow said pane means to move to said emergency position.

5. An emergency exit window for a vehicle comprising a moveable pane, retaining means for holding said pane in a plurality of vertical positions, said retaining means including spring biased latch means carried by said pane and stop means for engaging said latch means and limiting movement of said pane, said window having a first of said vertical positions in which said window is fully closed, a second of said vertical positions in which said window is fully open, an opening formed by said window in said second position being generally equal in area to the area defined by the main portion of said pane,
said window includes a full ventilation position between said first and second positions, a main stop corresponding to said ventilation position, said window being approximately half-open when in said full ventilation position,
said latch means have a plurality of actuation means, first actuation means for moving said widow between said first position and said full ventilation position, and second actuation means for moving said window to said second position.

6. An emergency exit window in accordance with claim 5 wherein:
said plurality of vertical positions are generally coplanar,
said pane sliding in vertical rails,
said stop means carried by said rails.

7. An emergency exit window in accordance with claim 5 wherein:
said stop means includes inversion stop means for preventing said pane from moving from said second position without actuation of said latch means.

8. An emergency exit window in accordance with claim 5 wherein:
said window includes a plurality of auxiliary ventilating positions and a plurality of intermediate stops corresponding to said auxiliary ventilating positions.

9. An emergency exit window in accordance with claim 5 wherein:
said first actuation means comprises a finger recess in said latch means, movement of said latch means by use of said first actuation means being limited so as to prevent movement of said latch means past said main stop.

10. An emergency exit window in accordance with claim 5 wherein:
said second actuation means comprises tensioning means connected to said latch means, emergency handle means for applying forces to said tensioning means so as to move said latches an amount greater than movement capable of being achieved with said first actuation means.

11. An emergency exit window in accordance with claim 5, further including switch means for sending a signal that said pane has moved to said second position.

12. An emergency exit window comprising a moveable pane, retaining means for holding said pane in a plurality of vertical positions, said retaining means including spring biased latch means carried by said pane and stop means for engaging said latch means and limiting movement of said pane, said window having a first of said vertical positions in which said window is fully closed, a second of said vertical positions in which said window is fully open, an opening formed by said window in said second position being generally equal in area to the area defined by the main portion of said pane,
said window includes at least one intermediate ventilation position in which said window is about half-open,
said stop means including a main stop means for limiting opening of said window beyond said intermediate ventilation position,
an emergency handle being capable of causing movement of said window beyond said intermediate ventilation position, switch means adjacent to said pane when said window is in said intermediate ventilation position to signal movement of said window to a condition in which said window is about fully open.

* * * * *